United States Patent [19]

Tricini

[11] Patent Number: 4,693,451
[45] Date of Patent: Sep. 15, 1987

[54] VALVE STRUCTURES
[75] Inventor: John D. Tricini, Greensburg, Pa.
[73] Assignee: Valve Systems, Inc., Pittsburgh, Pa.
[21] Appl. No.: 920,115
[22] Filed: Oct. 17, 1986
[51] Int. Cl.$^4$ ............................................. F16K 5/00
[52] U.S. Cl. .................................. 251/163; 251/162; 251/317
[58] Field of Search ................ 251/163, 164, 317, 162

[56] References Cited

U.S. PATENT DOCUMENTS 4,167,263 9/1979 Cupedo ........................... 251/163 X

FOREIGN PATENT DOCUMENTS 282276 2/1931 Italy ................................... 251/163

*Primary Examiner*—Harold W. Weakley
*Attorney, Agent, or Firm*—Buell, Ziesenheim, Beck & Alstadt

[57] ABSTRACT

A valve structure is provided having a housing with an open top valve chamber and inlet and outlet passages on opposite sides of the valve chamber forming a through passage with the valve chamber through said housing, a generally spherical radius valve seat on each passage at the valve chamber, a bonnet removably covering said valve chamber, a stem extending through said bonnet generally axially of the valve chamber, a pair of generally spherical radius closure discs in the valve chamber sealingly adapted to engage the valve seats, a disc carrier for each disc in the valve chamber, each disc carrier having a through passage in a plane transverse to the plane of the disc providing full flow therethrough from the inlet to the outlet passage when the valve is in opening position, an eccentric means provided on the stem and engaging each disc carrier for selectively moving the discs into and out of engagement with the valve seats and a guide between the bonnet and at least one of said disc carriers guiding the disc carriers on rotation of the stem from an open position in which the through passages in the disc carrier provides free flow between the inlet and outlet passages and a closed position in which the discs are aligned with the valve seats and holds the disc carriers in that position while the eccentric moves the discs selectively axially into and out of engagement with the valve seats.

7 Claims, 12 Drawing Figures

VALVE STRUCTURES

This invention relates to valve structures and particularly to a valve structure which rotates from an open to a closed position in the manner of a ball valve but, unlike a ball valve, it has closure elements which move axially of the valve bore to sealingly close and open the bore at the end of the closing operation or the beginning of the opening operation. This permits the used of a combination hard and soft seal between the rotary element and the valve housing.

There are many varied types of valve structures proposed for the control of fluid flow through a pipe system. Some of these valves find particular utility in control of gas flow and others in the control of liquid flow while some have proven adaptable for either gas or liquid flow. In all valves, regardless of their intended use, there are two important problems to be dealt with - namely avoiding wear and avoiding leakage. These problems are particularly important in valves which are used to control flammable gases. In the case of flammable gases there is a third important consideration, which is the ability to maintain a seal even in the presence of a flame. This requires generally a so-called "hard" or metal-to-metal seal, which is difficult both to obtain and to maintain in ordinary valve structures because of machining tolerances and wear.

I have discovered a valve structure which solves all of these problems while requiring a rotation from fully open to fully closed of approximately 225° ($22\frac{1}{2}$° to unlock from the full open position, 90° to pivot the stem from the open to the closed position, and then $112\frac{1}{2}$° to advance disks into the body seats to seal the valve). The valve of my invention provides both a hard or metal-to-metal seal and a so-called "soft" or resilient member-to-member seal.

I provide a vlave structure comprising a housing having an open top valve chamber and inlet and outlet passages on opposite sides of the valve chamber forming a through passage with the valve chamber through said housing, a generally spherical radius valve seat on each passage at the valve chamber, a bonnet removably covering the open top of said valve chamber, a stem extending through said bonnet generally axially of the valve chamber, a pair of generally spherically radius closure discs in the valve chamber to sealingly engage the valve seats, a disc carrier for each disc in the valve chamber, each disc carrier having a through passage in a plane transverse to the plane of the disc providing full therethrough from the inlet to the outlet passage when the valve is in open position, eccentric means provided on said stem and engaging each disc carrier for selectively moving the discs into and out of engagement with the valve seats and guide means between the bonnet and at least one of said disc carriers for guiding the disc carriers on rotation of the stem from an open position in which the through passages in the disc carrier provides free flow between the inlet and outlet passages and a closure position in which the discs are aligned with the valve seat and holds the disc carriers in that position while the eccentric means moves the discs selectively axially into and out of engagement with the valve seats.

In the foregoing general description of my invention, I have set out certain objects, purposes and advantages of this invention. Other objects, purposes and advantages of this invention will be apparent from a consideration of the following description and the accompanying drawings in which.

Figure 1:
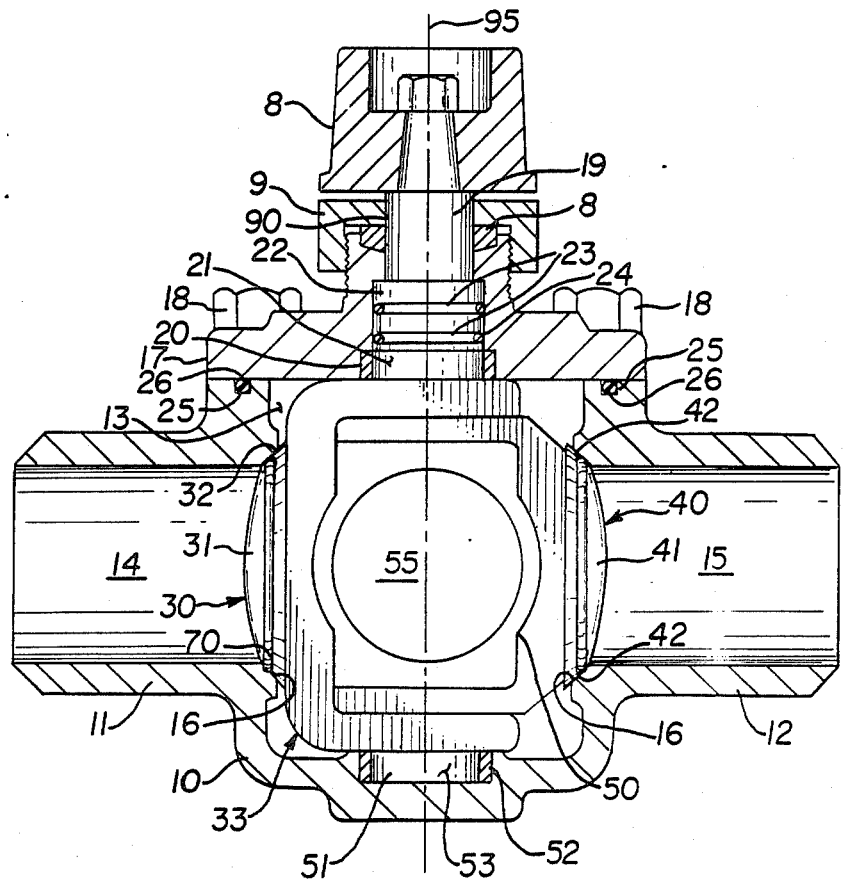
FIG. 1 is a section through a valve according to this invention with internal parts in elevation.
Figure 2:
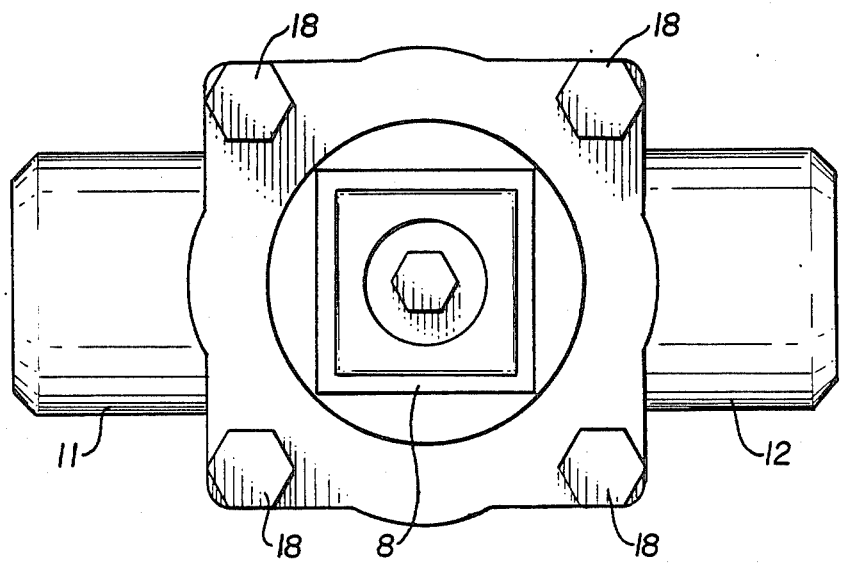
FIG. 2 is a top plan view of the valve of FIG. 1.
Figure 3:
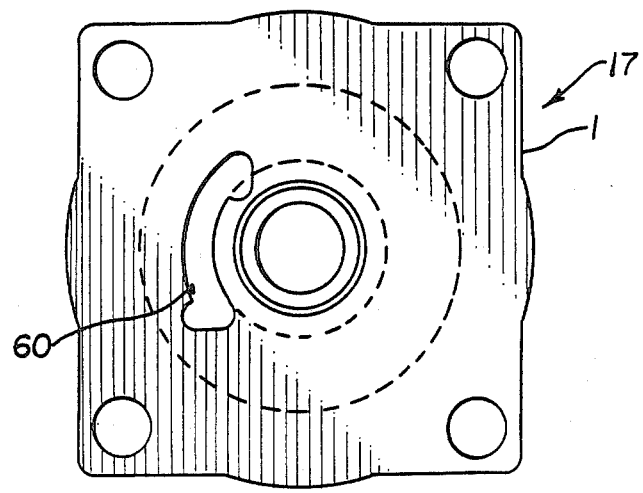
FIG. 3 is a bottom plan view of the bonnet of the valve of FIG. 1.
Figure 4:
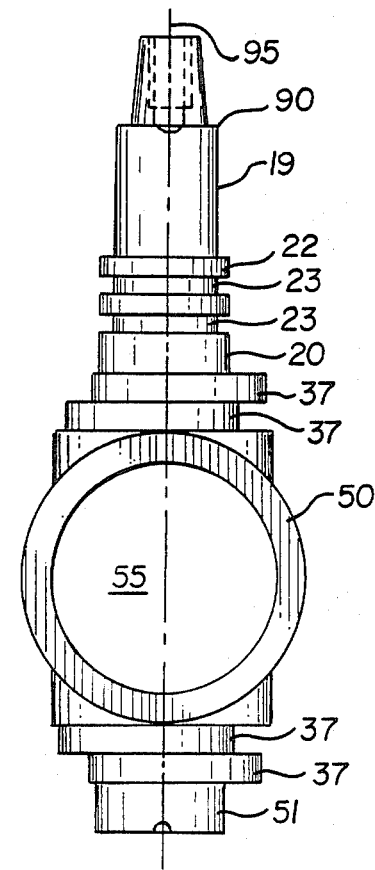
FIG. 4 is a front elevational view of the stem of the valve of FIG. 1.
Figure 5:
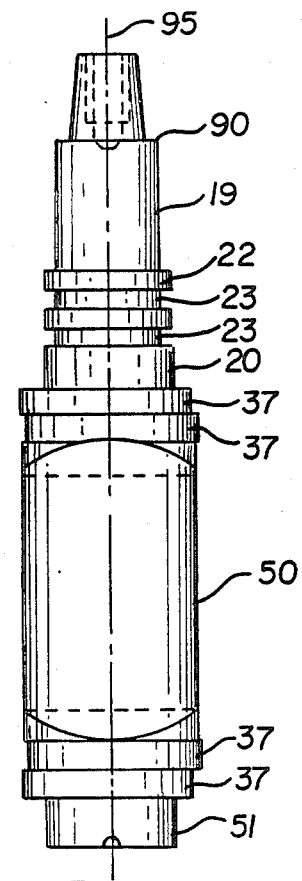
FIG. 5 is a side elevational view of the stem of the valve of FIG. 1.
Figure 6:
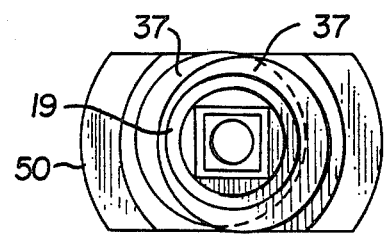
FIG. 6 is a top plan view of the stem of the valve of FIG. 1.

Referring to the drawings, I have illustrated a valve housing 10 having inlet 11 and outlet 12 arms on opposite sides thereof. A valve chamber 13 is provided in the housing communicating with inlet passage 14 in arm 11 and outlet passage 15 in arm 12 of the housing. The junction of the valve chamber 13 with each of passages 14 and 15 is provided with an annular bevel seat 16. Valve chamber 13 is open at the top and closed by a removable bonnet 17 held in place by spaced cap screws 18 threadingly engaging openings in housing 10. A stem 90 having upper 19, middle 50 and bottom 51 portions is provided in housing 10. Upper stem position 19 is rotatably mounted in bushing 20 in a passage 21 in bonnet 17. The upper stem 19 has an enlarged portion 22 provided with annular grooves 23 carrying rubber O-rings 24 for sealing engagement with passage 21. A secondary backup packing 8 and nut 9 provide additional sealing for upper stem 19. The housing 10 is also provided with a groove 25 around the open end of the valve chamber with a sealing O-ring 26 to seal the housing 10 to bonnet 17.

A middle stem portion 50 is provided between upper stem portion 19 and bottom stem portion 51 which is journalled in bushing 52 in recess 53 in the bottom of valve chamber 13. Middle stem portion 50 includes a flow through passage 55. A pair of circular cam plates 37 are integrally formed in stem 90 between the upper and middle portions and between the middle and bottom portions thereof. The center of each cam plate is provided at a location spaced from the vertical center line 95 of stem 90.

Figure 7:
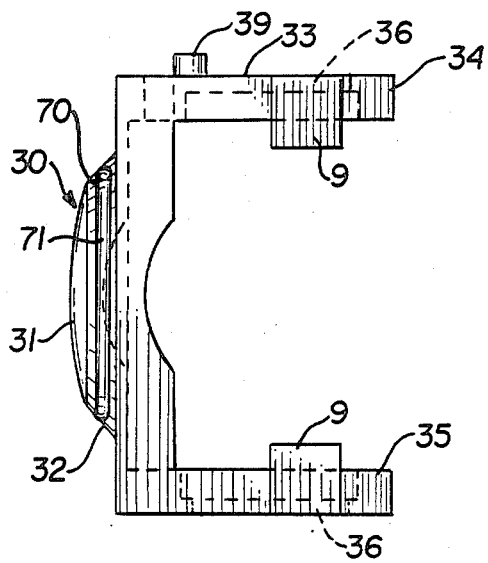
FIG. 7 is a side elevational view of a disc closure and carrier for one side of the valve.
Figure 8:
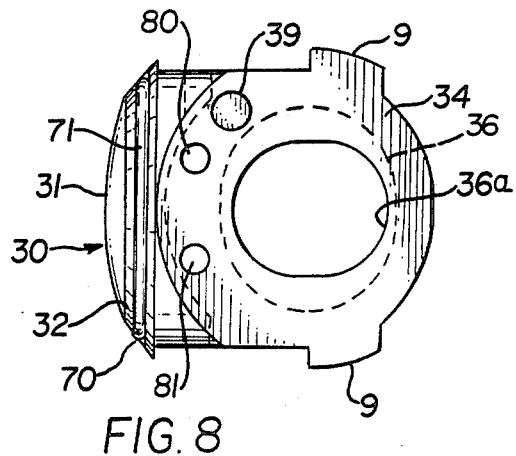
FIG. 8 is a top plan view of the disc closure and carrier of FIG. 7.
Figure 9:
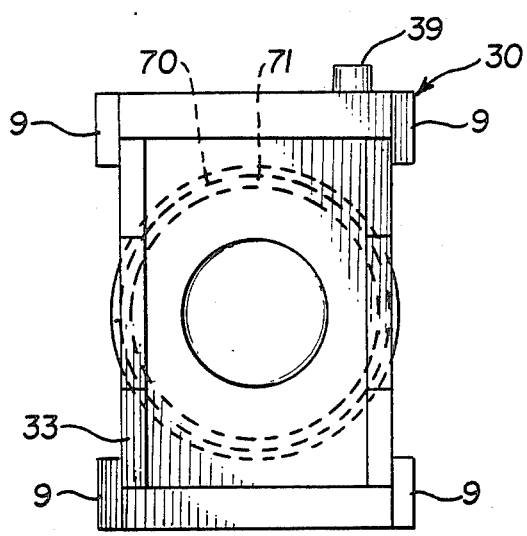
FIG. 9 is a rear elevational view of the disc closure and carrier of FIG. 7.
Figure 10:
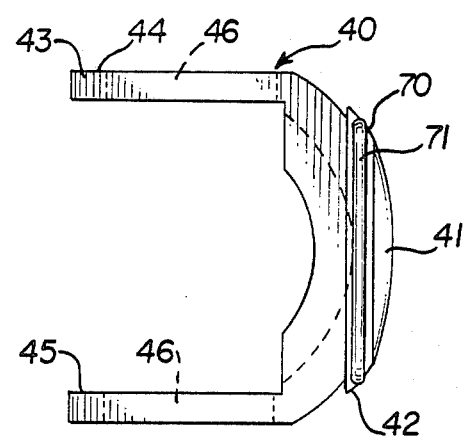
FIG. 10 is a side elevational view of a disc closure and carrier for the other side of the valve of FIG. 1.

One closure member 30 (the left one of FIG. 1) is provided with an annular closure disc 31, preferably of partially hemispheric form having a beveled edge 32 surrounding it and adapted to fit in and against bevel surface 16 between the valve chamber and passage 14. The closure disc 31 is carried on and is preferably integral with a disc carrier 33 of generally channel cross-section. The carrier side arms 34 and 35 are each provided with two elongated openings, the first opening 36 adapted to receive a cam plate 37 of stem 90 (dotted opening in FIG. 8) and a second opening 36a adapted to receive a portion of stem part 20 in the upper side arm 34, and a portion of stem part 51 in the lower side arm 35 (this second opening is shown in solid line in FIG. 8 and this engagement keeps the disc centered). Top arm 34 (FIG. 7) also carries an upstanding pin 39 at one side. Additionally, two ears 9 are provided on each of arms 34 and 35.

The other closure member 40 (the right one in FIG. 1) is similarly provided with an annular closure disc 41 preferably of partially hemispherical form having a beveled edge 42 surrounding its periphery and adapted to be in and against the bevel surface 16 of passage 15 between the valve chamber and passage 15. The closure disc 41 is carried on and is preferably integral with a disc carrier 43. Carrier 43 is positioned between the arms 34 and 35 of carrier 33 in an engaging relationship with ears 9. Carrier 43 is of generally channel cross-section with side arms 44 and 45 each provided with an elongated opening 46 adapted to receive a cam plate 37 of stem 90. Rotation of carrier 33 causes carrier 43 to rotate in like fashion.

In operation the valve is assembled as in FIG. 1, with the bottom stem 51 in bushing 52 in recess 53 of the valve chamber and the upper stem 19 rotatably mounted in bushing 20 in passage 21 of bonnet 17. The cam plates 37 are arranged eccentrically in opposite directions in the two closure members 30 and 40. The bonnet is then placed over the assembled valve with guide slot 60 in the bottom surface engaging pin 39 in closure member 30. The bonnet is fastened in position and tightened with cap screws 18 and operating nut 8 is installed on the exposed end of upper stem 19.

Assuming that the valve is in the closed position as illustrated in FIG. 1, rotation of operating nut 8 and stem 90 in the counterclockwise direction caused the cam plates 37 to rotate eccentrically moving closure discs 31 and 41 inwardly towards the axis of stem 90. Continued rotation causes the entire assembly to rotate so that fluid can pass freely between arms 44 and 45 of carrier 40 and between side arms 34 and 35 of carrier 30. Continued rotation thereafter moves the closure discs 31 and 44 further inwardly toward the axis of stem 90, aligning the stem opening 55 with the side arm opening and the body passages 14 and 15 for full unrestricted flow in the opening position. As the stem 90 is rotated the two carriers 30 and 40 are guided in their motion from closed to open position by guide pin 39 of carrier 30 moving in guide slot 60 in bonnet 17.

The beveled edges 32 and 42 of disc closures 31 and 41 are preferably provided with grooves 70 carrying rubber O-rings 71. These O-rings 71 provide a "soft seal" against bevel edges 16 while the metal bevel edges 32 and 42 provide a "hard seal". One can accordingly obtain both a hard and soft seal in the valve of this invention.

Figure 11:
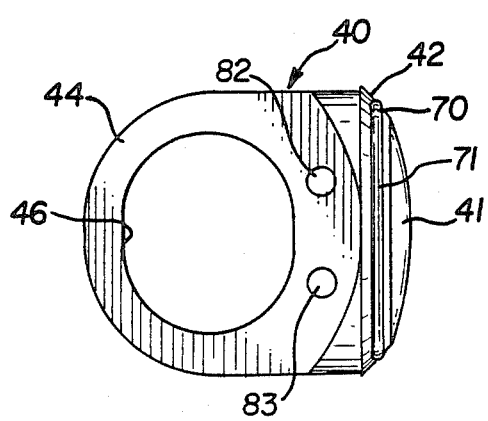
FIG. 11 is a top plan view of the disc closure and carrier of FIG. 10.
Figure 12:
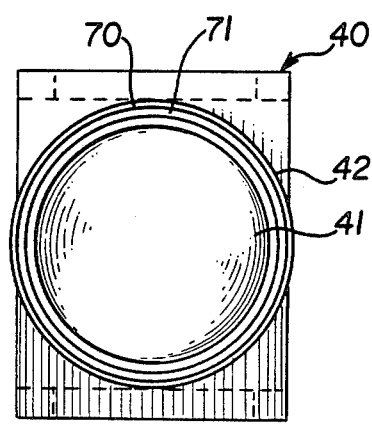
FIG. 12 is a rear elevational view of the disc closure and carrier of FIG. 10.

Assembly pins 80 and 81 are provided in side arm 34 (FIG. 8) and similar assembly pins 82 and 83 are provided in side arm 44 (FIG. 11). These pins are used to reattach the respective upper side arms after positioning onto the stem.

In the foregoing specification I have set out certain preferred practices and embodiments of this invention, however, it will be understood that this invention may be otherwise embodied within the scope of the following claims.

I claim:

1. A valve structure comprising a housing having an open top valve chamber and inlet and outlet passages on opposite sides of the valve chamber forming a through passage with the valve chamber through said housing, a generally spherical radius valve seat on each passage at the valve chamber, a bonnet removably covering said chamber, a stem extending through said bonnet generally axially of the valve chamber, said stem including a middle stem portion of generally rectangular shape having an annular opening therethrough, a pair of generally spherical radius closure discs in the valve chamber sealingly adapted to engage the valve seats, each said disc having an annular beveled sealing surface, an annualr groove in said sealing surface, a resilient seal ring in said groove, a disc carrier of generally U-shape for each disc in the valve chamber, each disc carrier having a through passage in a plane transverse to the plane of the disc providing full flow therethrough from the inlet to the outlet passage when the valve is in opening position, eccentric means provided on said stem and engaging each disc carrier for selectively moving the discs simultaneously into and out of engagement with the valve seats and guide means between the bonnet and at least one of said disc carriers guiding the disc carriers on rotation of the stem from an open position in which the through passages in the disc carrier provides free flow between the inlet and outlet passages and a closed position in which the discs are aligned with the valve seats and holds the disc carriers in that position while the eccentric means moves the discs selectively axially into and out of engagement with the valve seats.

2. A valve structure as claimed in claim 1 wherein the generally spherical radius closure discs have spherical radius sealing surfaces of smaller radius than the disc body.

3. A valve structure as claimed in claim 1 wherin the eccentric means are circular plates attached to said stem out of alignment with a vertical center line of said stem.

4. A valve structue as claimed in claim 3 wherein said circular plates are integrally formed on said stem.

5. A valve structure as claimed in claim 1 or 2 wherein the guide means includes a guide slot in the bonnet and a guide pin on said at least one carrier moving in said guide slot.

6. A valve structure as claimed in claim 3 wherein the generally spherical radius closure discs have spherical radius sealing surface of smaller radius than the disc body.

7. A valve structure as claimed in claim 5 wherein the generally spherical radius closure discs have spherical radius sealing surfaces of smaller radius than the disc body.

* * * * *

UNITED STATES PATENT AND TRADEMARK OFFICE
CERTIFICATE OF CORRECTION

PATENT NO. : 4,693,451
DATED : September 15, 1987
INVENTOR(S) : JOHN D. TRICINI

It is certified that error appears in the above-identified patent and that said Letters Patent is hereby corrected as shown below:

Column 1, line 39, change "vlave" to --valve--.

Column 1, line 52, before "therethrough" insert --flow--.

Column 4, line 13, Claim 1, before "chamber" insert --valve--.

Column 4, line 20, Claim 1, change "annualr" to --annular--.

Column 4, line 42, Claim 3, change "wherin" to --wherein--.

Column 4, line 45, Claim 4, change "structue" to --structure--.

Signed and Sealed this

Nineteenth Day of January, 1988

Attest:

DONALD J. QUIGG

Attesting Officer

Commissioner of Patents and Trademarks